United States Patent [19]

Desjardins et al.

[11] Patent Number: 4,996,714
[45] Date of Patent: Feb. 26, 1991

[54] COMPUTERIZED FILING AND RETRIEVAL SYSTEM FOR SIGNATURE AND PICTORIAL DOCUMENTATION

[75] Inventors: Pierre Desjardins, Bellefeuille; Paul Trudel, Vimont; Jean-Marc Leroux, Ste-Dorothée, all of Canada

[73] Assignee: Frisco Bay Industries of Canada Limited, St. Laurent, Canada

[21] Appl. No.: 527,390

[22] Filed: May 23, 1990

[51] Int. Cl.⁵ .............................................. G06K 9/00
[52] U.S. Cl. ...................................... 382/3; 382/56; 340/825.3; 358/102
[58] Field of Search .................. 382/3, 56; 358/102; 340/825.3, 825.31, 825.34; 235/379

[56] References Cited

U.S. PATENT DOCUMENTS

| | | | |
|---|---|---|---|
| 3,539,715 | 11/1970 | Lemelson | 358/102 |
| 3,718,908 | 2/1973 | Bloomstein | 382/3 |
| 4,020,463 | 4/1977 | Himmel | 382/56 |
| 4,271,430 | 6/1981 | O'Brien | 358/102 |
| 4,364,024 | 12/1982 | Paetsch | 382/56 |
| 4,453,267 | 1/1984 | Paganini et al. | 382/56 |
| 4,701,960 | 10/1987 | Scott | 382/3 |

Primary Examiner—Leo H. Boudreau
Attorney, Agent, or Firm—Foley & Lardner

[57] ABSTRACT

A camera is in communication with a microcomputer, having a memory. A plurality of communication controllers are in communication with the microcomputer, and each communication controller is in control of up to two monitors. Pictorial data from the camera is compressed and stored in the microcomputer memory. To display the pictorial data on a monitor, the monitor queries its associated communication controller which in turn queries the microcomputer. The microcomputer determines the location of the coded data associated with the pictorial document in the memory and decodes the coded data. The decompressed data is provided to the requesting monitor whereby to display the pictorial data on the screen of the requesting monitor.

8 Claims, 22 Drawing Sheets

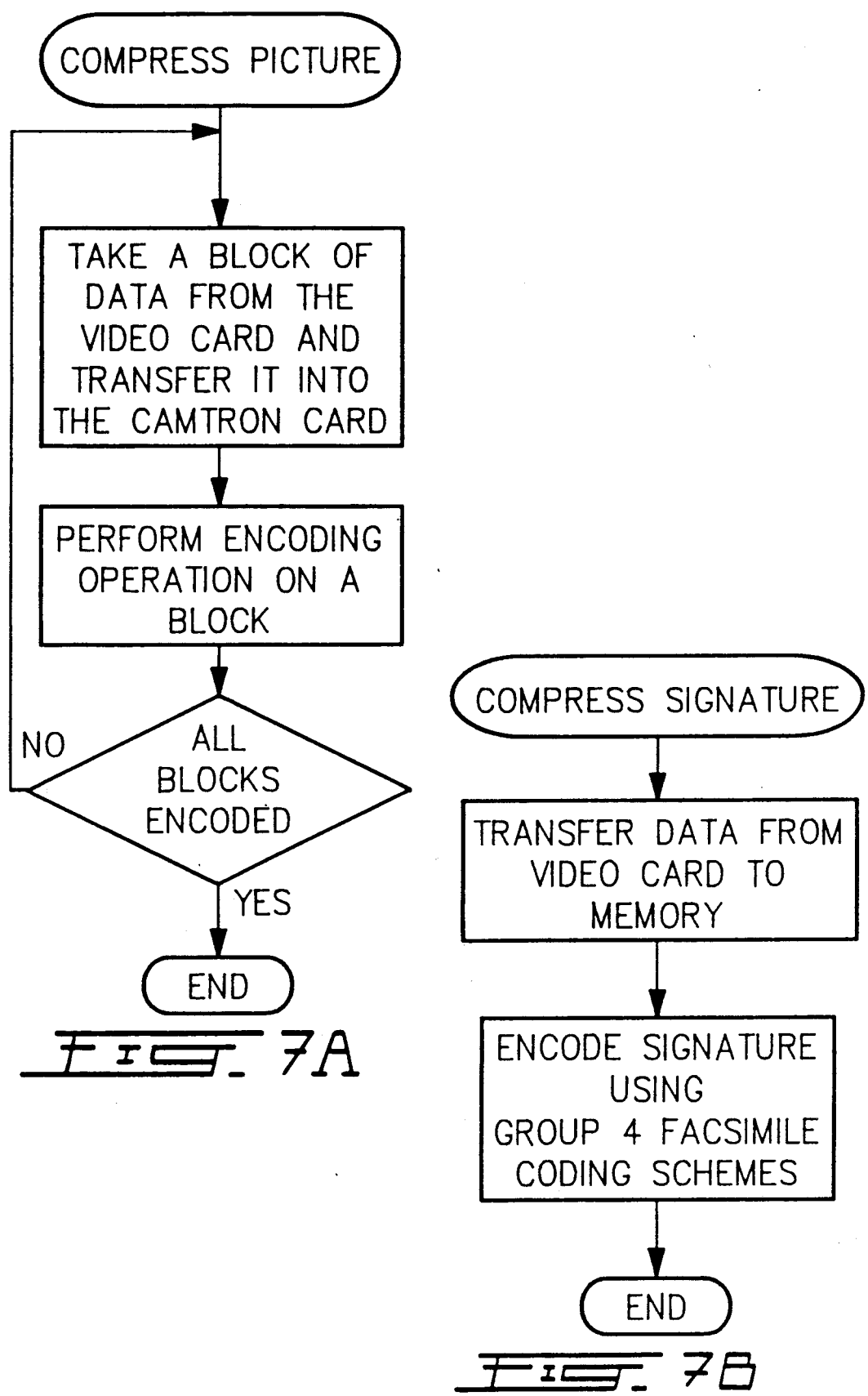

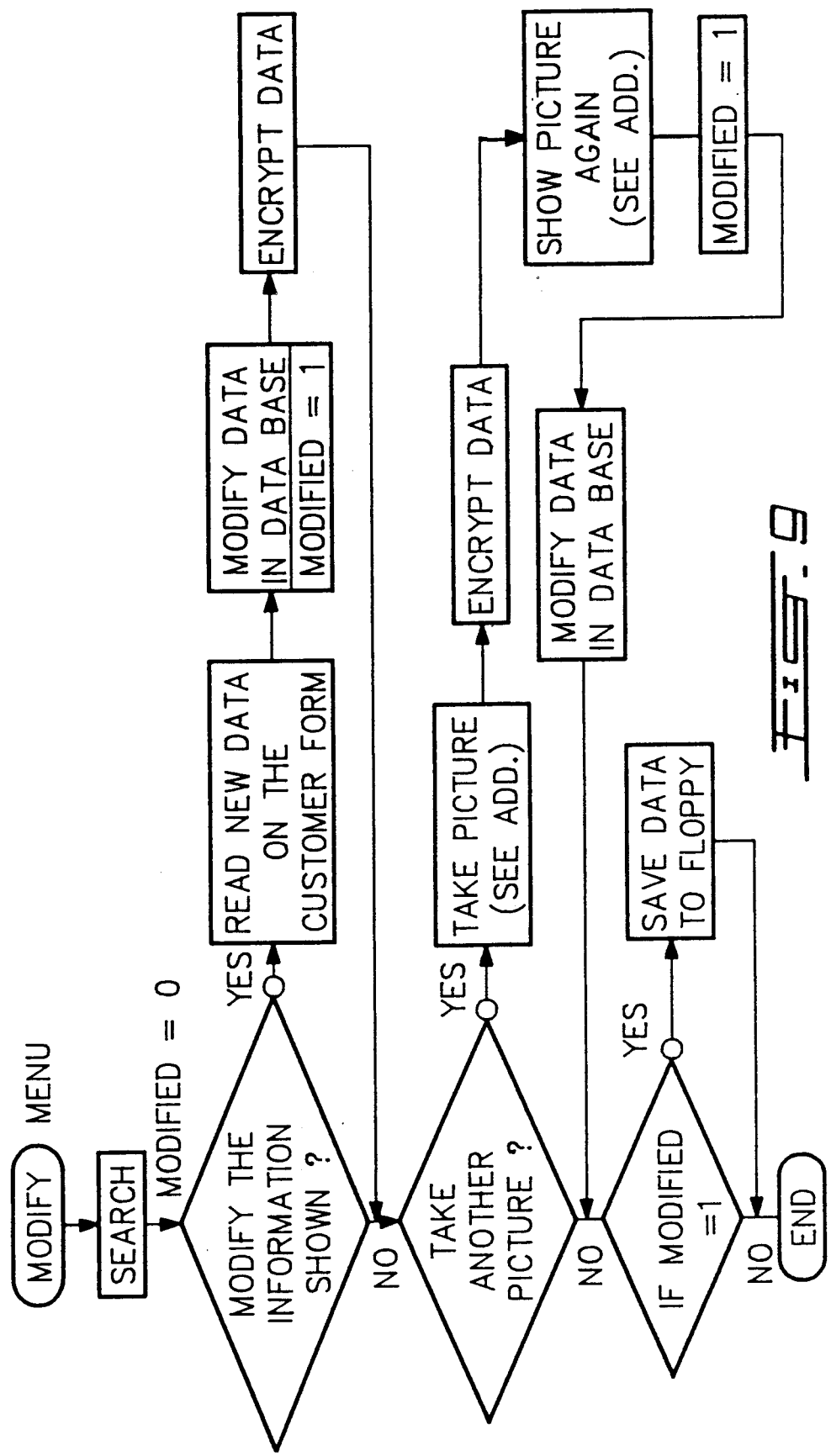

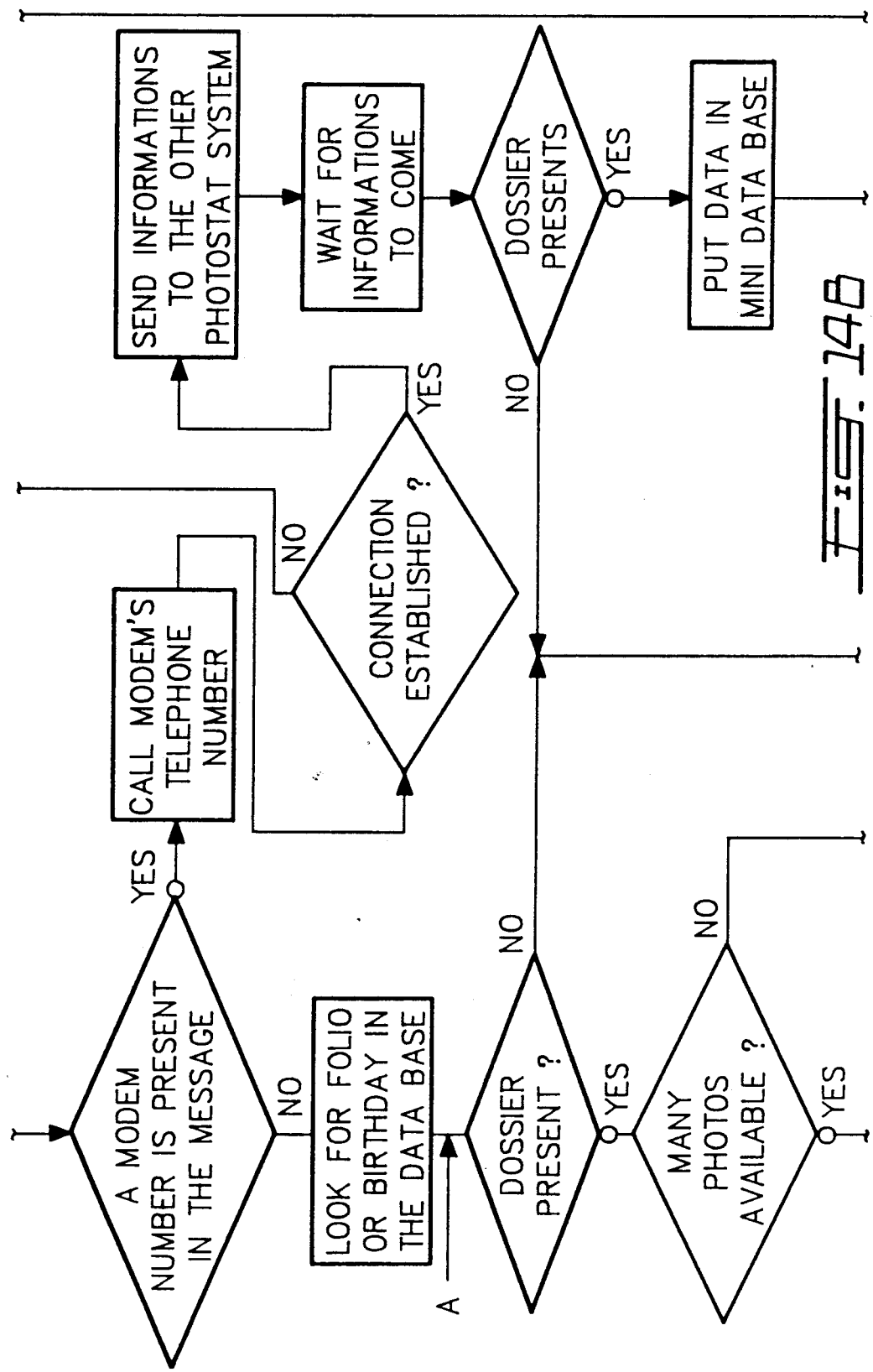

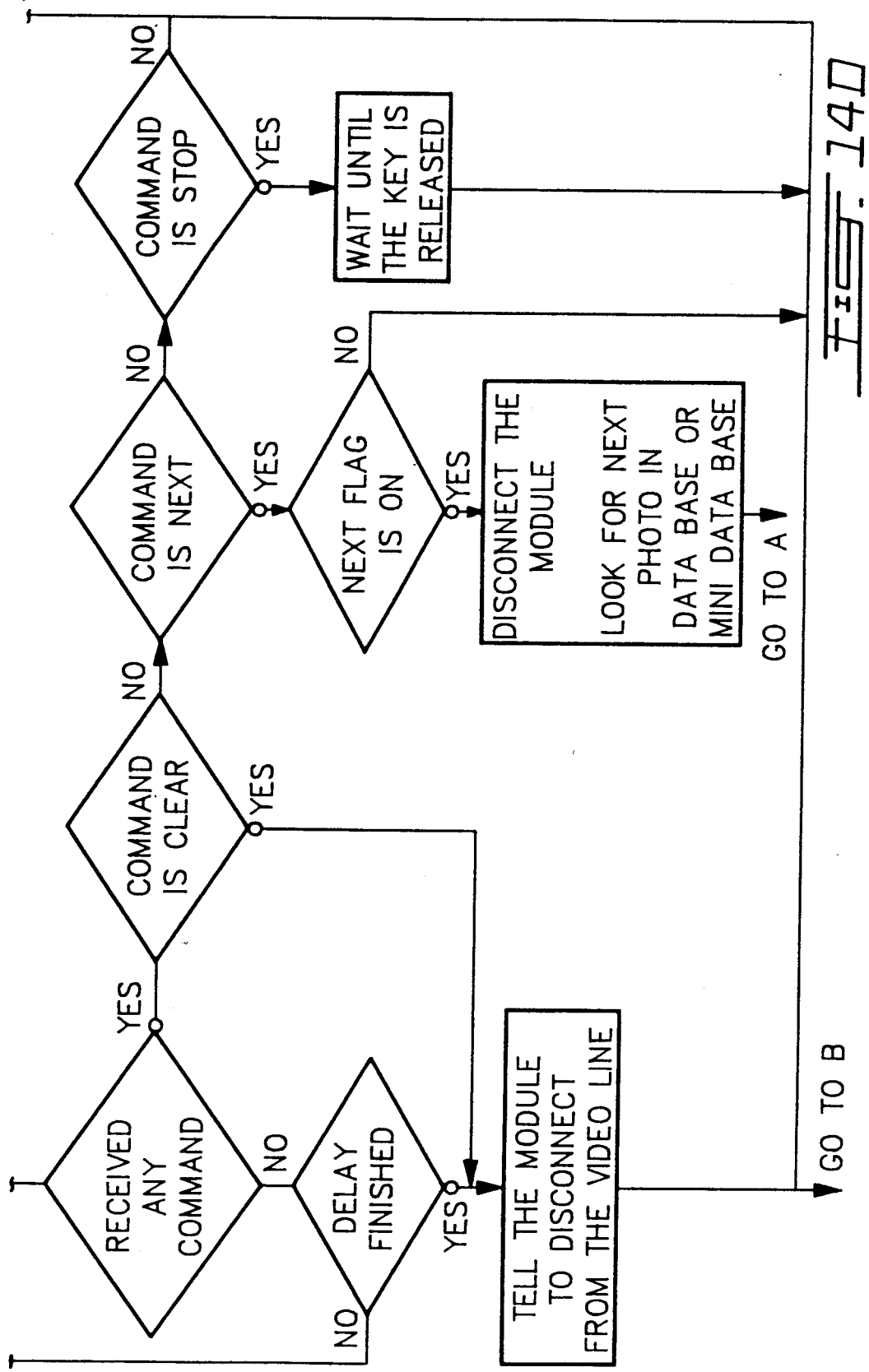

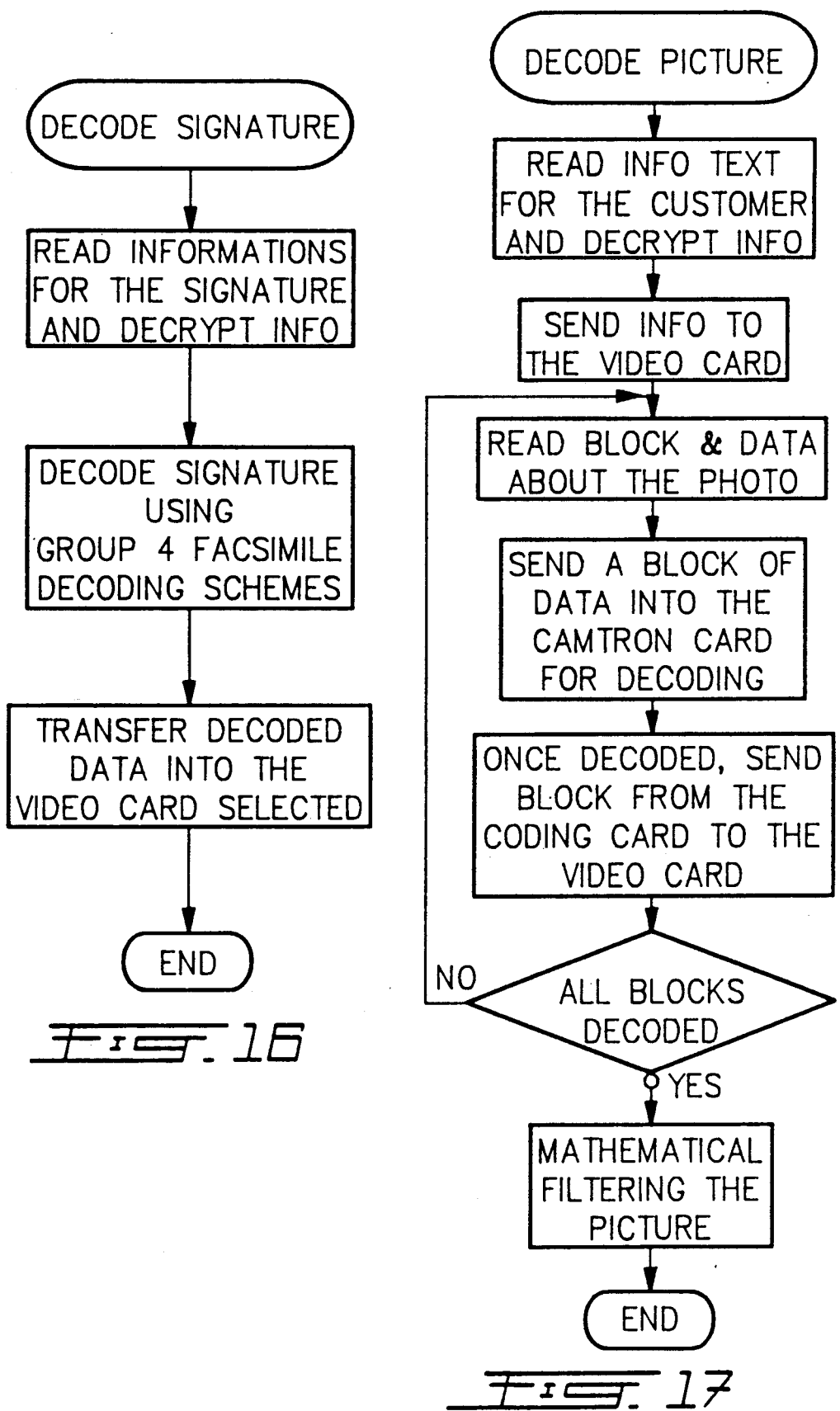

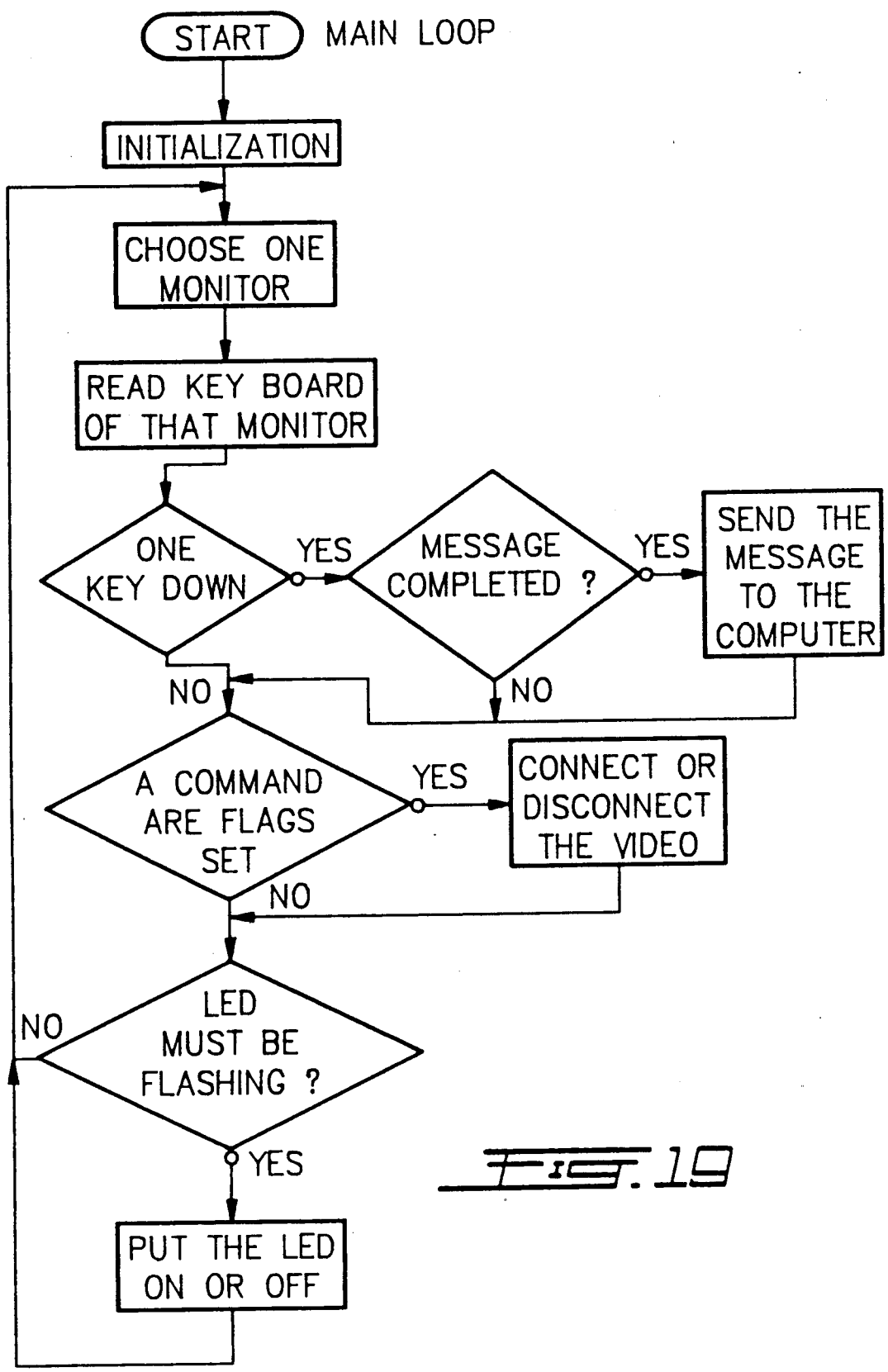

COMPUTERIZED FILING AND RETRIEVAL SYSTEM FOR SIGNATURE AND PICTORIAL DOCUMENTATION

BACKGROUND OF INVENTION

1. Field of the Invention

The invention relates to a computerized filing and retrieval system for signatures and pictorial documentation. More specifically, the invention relates to such a system wherein a single microcomputer having a hard disc, and which stores the data for the creation of the signatures and pictorial documentation in its hard disc, feeds a plurality of monitors through communication controllers.

2. Description of Prior Art

In prior art devices, as illustrated in, for example, U.S. Pat. No. 3,539,715, Lemelson, Nov. 10, 1970 and U.S. Pat. No. 4,271,430, O'Brien, June 2, 1981, pictorial information and the like is stored in its physical form as, for example, microfiche or cards. Thus, in the '715 patent, the pictorial information is stored on an endless belt 18' shown in FIG. 1 of the patent. As described at column 3, lines 50 et seq. of the patent, "The information is stored in the form of recorded areas of belt 18' as frames of documents or picture images which may be developed in photographic film, or printed on photosensitive paper or the like. Said frames are mounted or provided in any suitable manner on the conveyor belt 18 and are preferably arranged in a plurality of aligned columns so that scanning of selected frames and the reproduction of picture signals at the monitor stations may be effected rapidly and without difficulty".

In the '430 Patent, the pictorial information is stored in a film selection and positioning box 38 in FIG. 1 of the Patent. In the example illustrated in the Patent, the pictorial information is stored on microfiche cards 44.

The storage of such pictorial information in its physical form requires rather large amounts of storage space, and also requires physical movement of, for example, the microfiche cards etc. which is both time-consuming and subject to lack of reliability.

It is also known in the art to store pictorial information in encoded form in the memory, for example, the hard disc, of a microcomputer. However, with presently available such systems, the microcomputer typically drives a single monitor to display the pictorial information, and the monitor is disposed in a single predetermined location. Thus, in the environment of a bank, the microcomputer would be disposed in a location perhaps close to the teller stations. However, each time a teller wishes to make use of the pictorial information, he must go to the location of the micro-computer to view the monitor. This is inconvenient and somewhat unreliable. Thus, the teller must carry with him in his human memory an image of a customer whose identity he wishes to ascertain. If the customer is not the true customer but looks somewhat like the true customer, then the teller can very easily make a positive identification in error.

In a large plant having several entrances being relatively far from each other, such a system would be completely useless unless a separate microcomputer is placed at each entrance.

SUMMARY OF INVENTION

It is therefore an object of the invention to provide a computerized filing and retrieval system for signatures and pictorial documentation which overcomes the disadvantages of the prior art.

It is a more specific object of the invention to provide a system wherein a single microcomputer feeds a plurality of monitors which are spaced from each other.

It is a still further object of the invention to provide such a system wherein the microcomputer feeds the monitors through communication controllers. Each such communication controller is assocated with two monitors.

It is a still further object of the invention to provide such a system where each of the communication controllers are in communication with said microcomputer through an interface.

In accordance with the invention, there is provided a computerized filing and retrieval system for signatures and pictorial documentation which comprises:

camera means;

a microcomputer having a memory means and being in communication with said camera means;

means for converting pictorial and signature information to coded data which is stored in said memory means at predetermined locations thereof;

peripheral controller means in communication with said microcomputer;

a plurality of communication controller means in communication with said microcomputer;

a plurality of monitors for displaying said signature and pictorial documentation;

each said monitor being in communication with only one communication controller means, each said communication controller means being in communication with up to two monitors;

wherein, on receipt of a query signal by an nth communication controller means from an mth monitor, in communication with said nth communication controller means, said query signal being associated with a pth signature or pictorial document, said nth communication controller means queries said microcomputer;

said microcomputer determining the location of the coded data associated with said pth signature or pictorial document in said memory means and decoding said coded data associated with said pth signature or pictorial document;

whereby, to provide, to said mth controller, the data for creating said pth signature or pictorial document through said nth communication controller means.

BRIEF DESCRIPTION OF DRAWINGS

The invention will be better understood by an examination of the following description, together with the accompanying drawings, in which:

FIG. 7 is a flow chart of the COMPRESS PICTURE-COMPRESS SIGNATURE block of FIG. 6;

FIG. 9 is a flow chart of the MODIFIED block of FIG. 5;

FIG. 15 is a flow chart of the SHOW PHOTO block of FIG. 14;

FIG. 16 is a flow chart of the DECODE SIGNATURE block of FIG. 15;

FIG. 17 is a flow chart of the DECODE PICTURE block of FIG. 15;

FIG. 18 is a block diagram of the MODEM IS NOT READY block of FIG. 14;

FIG. 19 is a flow chart of the COMMUNICATIONS MODULE block of FIG. 3;

DESCRIPTION OF PREFERRED EMBODIMENTS

Figure 1:
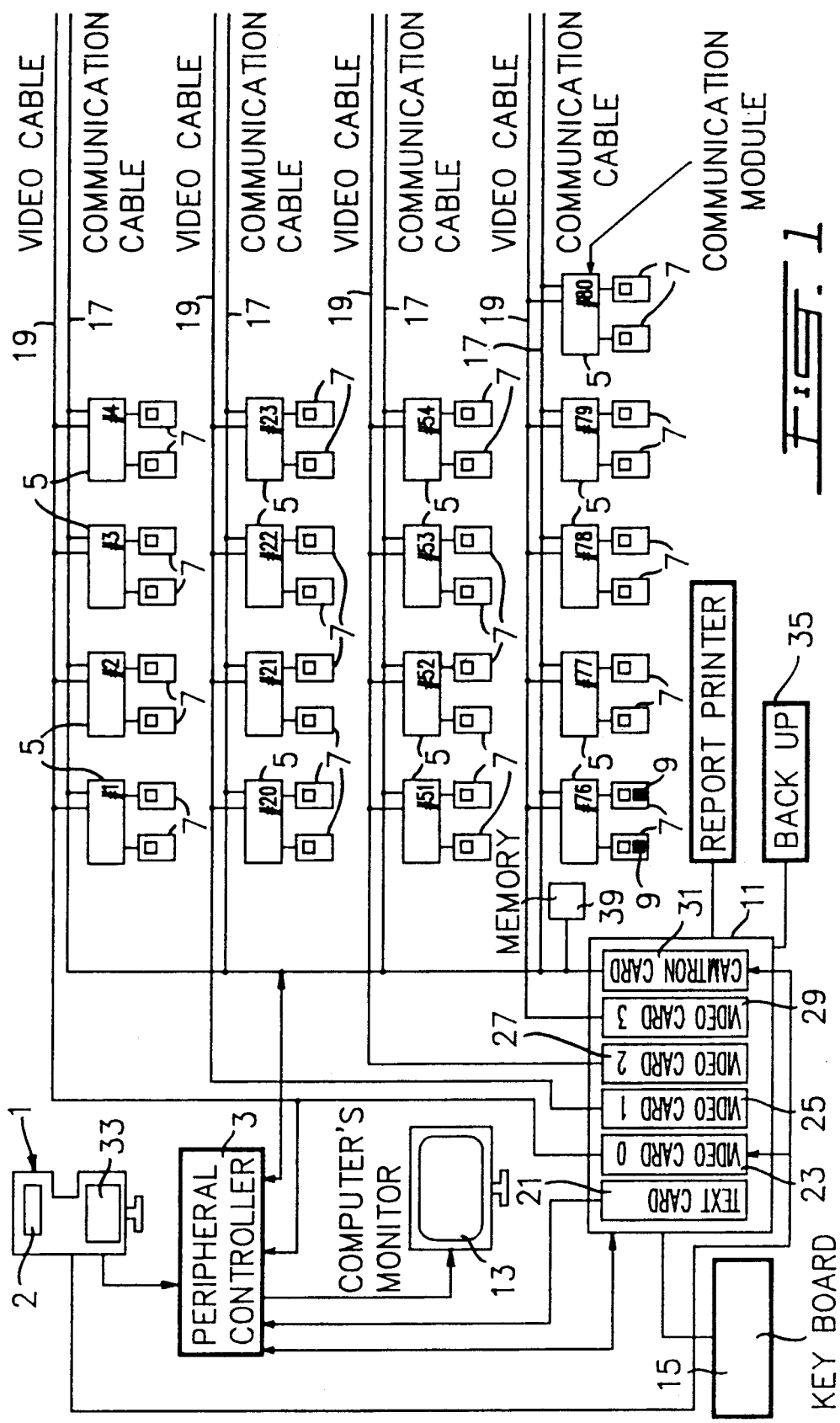
FIG. 1 is a block diagram of the inventive system.

Referring to FIG. 1, the inventive system comprises a camera arrangement 1 including, for example, a CCD (charge couple device) camera 2. The camera takes pictures of people who will be identified by the system at a later time.

The camera is coupled to peripheral controller means 3 which is in turn coupled to a plurality of communication controller means 5. Each communication controller means controls up to two remote monitors 7. Each monitor includes a keyboard 9.

The communication controller means 5 are also coupled to a microcomputer 11, for example, an IBM-AT compatible microcomputer. Monitor 13 and keyboard 15 are associated with the microcomputer 11.

The communication controller means are in communication with the microcomputer 11 and the peripheral controller 3 by communication cable 17. The communication controller means are also in communication with the microcomputer alone by video cable means 19.

The system also includes a video printer 33 installed in camera arrangement 1 in communication with microcomputer 11.

The microcomputer 11 includes a text card 21 and video cards No. 0, 1, 2 and 3. The video cards may comprise "frame grabbers" PIP-512B of Matrox Electronic Systems, Ltd. The frame grabber card digitalizes and rebuilds the picture. In the illustrated embodiment, video card 0 is associated both with the computer monitor 13 and with the monitors associated with communication controller means #1, #2, #3 and #4 . . . 25, video card 1 is associated with communication controller means #26, #27, #28, #29 . . . 50, video card 2 is associated with communication controller means #51, #52, #53, #54 . . . 75, and video card 3 is associated with communication controller means #76, #77, #78, #79, #80 . . . 99. In a preferred embodiment, each line of communication controller means comprises 25 communication controller means so that the entire system includes 99 communication controller means and therefore up to 198 video monitors. All of the monitors can, of course, be remotely located.

Also included in the microcomputer 11 is a coding card which includes circuitry which compresses data from the camera 1 to provide compressed data for storage in the hard disc memory 39 of the microcomputer 11. Accordingly, a large number of pictures can be stored in the microcomputer memory 39. The coding card also includes circuitry for decompressing the data to build pictures from the stored data. For these purposes, the coding card includes the VSP-161 chip from Zoran and communication means RS-485 between it and all communication controller means.

The peripheral controller means 3 has two video inputs and one video output. One of the video inputs is connected to the output of the text card of the microcomputer 11, and the other video input is connected to the output of vide card 0 of the microcomputer. The video output of the peripheral controller means 3 is connected to the computer monitor 13.

The peripheral controller means 3 has two communication input/output jacks that are connected in parallel and another special connector that is connected (with a four-conductor wire with a telephone connector at one end) to the CCD camera 2 and to the video printer 33 (both of which are installed in the camera arrangement 1).

One of these two communication input/output jacks is connected to the communication card 31 in the microcomputer 11. The other jack is connected to one communication controller input/output jack, and so on. To connect these jacks together, we use a four-conductor wire with telephone connectors at both ends.

With this set-up it is possible to see, on the computer monitor 13, what is being "seen" in the camera 1. In addition, with an appropriate command from the microcomputer 11, it is possible to print out on the video printer 33 what is being "seen" on the camera 1.

Each remote monitor 7 comprises a, for example, WatchCam produced by Sony. A separate membrane keyboard is attached to the monitor and is separate therefrom (contrary to what is shown in FIG. 1). A twenty-pin connector connects each monitor to its associated communication controller means.

The communication controller means 5 are responsible for reading and decoding the inputs from the keyboards 9 of their associated monitors 7. They also validate the sequence of keys pressed on the keyboards 9 to determine whether a folio request or a command must be sent to the computer. In addition, the communication controller means 5 receive and accept commands from the microcomputer 11 to connect to the video cable or to disconnect from the video cable.

The camera arrangement 1 was developed by Applicant herein and is distributed under the trade mark PhotoQuick III. It includes a CCD camera 2, comprising a Sanyo camera. The printer 33 of the camera arrangement 1 is a Sony videographic printer. The monitor 13 is a part of the PhotoQuick III system and comprises a WatchCam Sony monitor. As can be seen, the camera 1 has a video output which is connected directly to video card 0. It is also in communication with the peripheral controller means 3.

Figure 2:
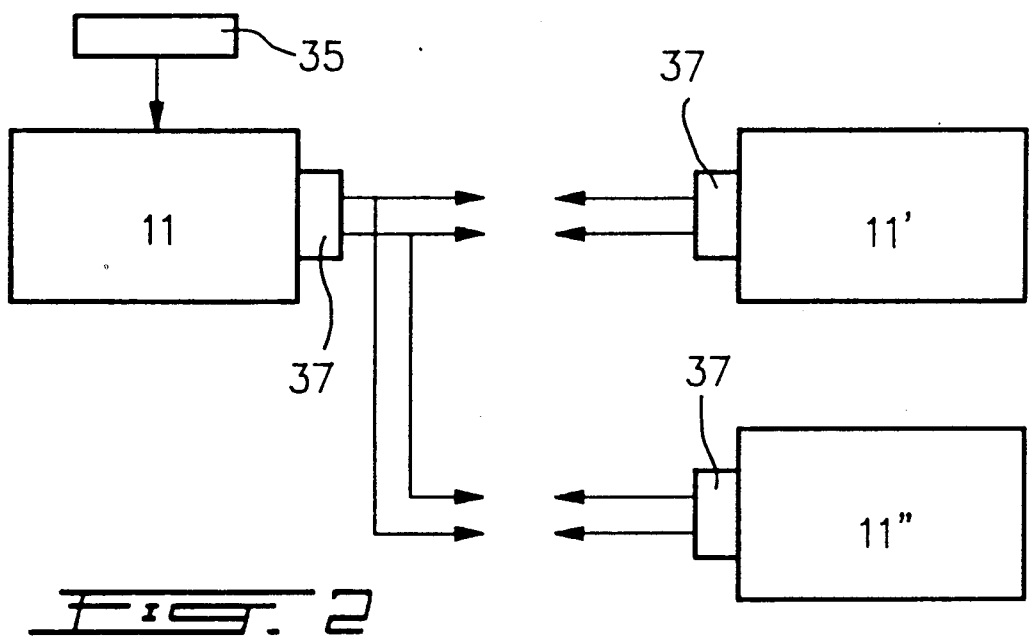
FIG. 2 illustrates a plurality of inventive such systems in communication with each other by telephone lines.

The remote monitors 7 of the illustrated system would normally be located remotely from the microcomputer 11, which may be kept in a protected location, and which can include a back-up facility 35, but normally in the same building as the microcomputer 1. It is also possible for the present system to communicate with like systems disposed in geographically remote locations. Such communication would be conducted over telephone lines and through MODEMS 37 as illustrated in FIG. 2.

The system may also include a report printer 100 driven by the microcomputer 11.

In operation, the system is driven by the software whose flow charts are illustrated in FIGS. 3 to 21 which illustrate the step-by-step procedures carried out in the various elements of the system. However, in general terms, the first step is to load the hard disc of the microcomputer 11 with pictorial data. For this purpose, pictures are taken, one at a time, of customers using the camera 1. The data from the camera 1 is fed to the coding card 31 where it is compressed and then stored on the hard disc memory 39 of the microcomputer 11. Indices are prepared for the purpose of being able later to retrieve this data in the memory. The indices may comprise a list of folio numbers and birth dates of customers.

At the same time, the picture is displayed on the computer monitor 13, by utilizing the output of peripheral controller means 3 which is connected to the output of video card 0 whose input is connected to the output of the camera 1. By pressing a predetermined code on the keyboard 15, a hard copy of the picture being viewed in the camera will be made on the printer 33.

The data of pictures can be modified to either change parameters or to delete the pictures from memory in accordance with the software to be discussed below.

When a teller or guard or the like at a remote monitor (an mth monitor) wishes to call up the picture of a specific individual on his monitor (a pth signature or pictorial document), . he inserts an appropriate command through the keyboard 9 associated with his monitor. He then inserts identification data (folio number or birth date), and all of this information is communicated, through its associated communication controller means 5 (an nth communication controller means), to the microcomputer.

This initiates action in the microcomputer 11 to search for the appropriate file in the hard disc memory 39 of the microcomputer 11. If a file cannot be located, then the computer will cause a message, such as "no picture available—file not located" on the screen of the querying monitor. If the file is located, then the microcomputer 11 will decompress the data of the file and send the decompressed data to the screen of the querying monitor.

Before the microcomputer sends out the video data, it will notify the associated communication controller means to switch the querying monitor to video cable.

The message or picture will remain on the monitor screen for a predetermined time or until the monitor operator requests that it be removed, whichever is the lesser.

To receive REQUEST information from the communication controller means 5, the microcomputer 11 will query each of the communication controller means 5 at predetermined intervals. When two monitors connected to the same video card request a picture, the request of the second monitor will be queued until the display is removed from the screen of the first requesting monitor. The data will then be provided to the second requesting monitor.

Turning now to FIGS. 3 to 21, the main thrust of each flow chart will be described. The step-by-step procedures will be apparent from the flow charts themselves.

Figure 3:
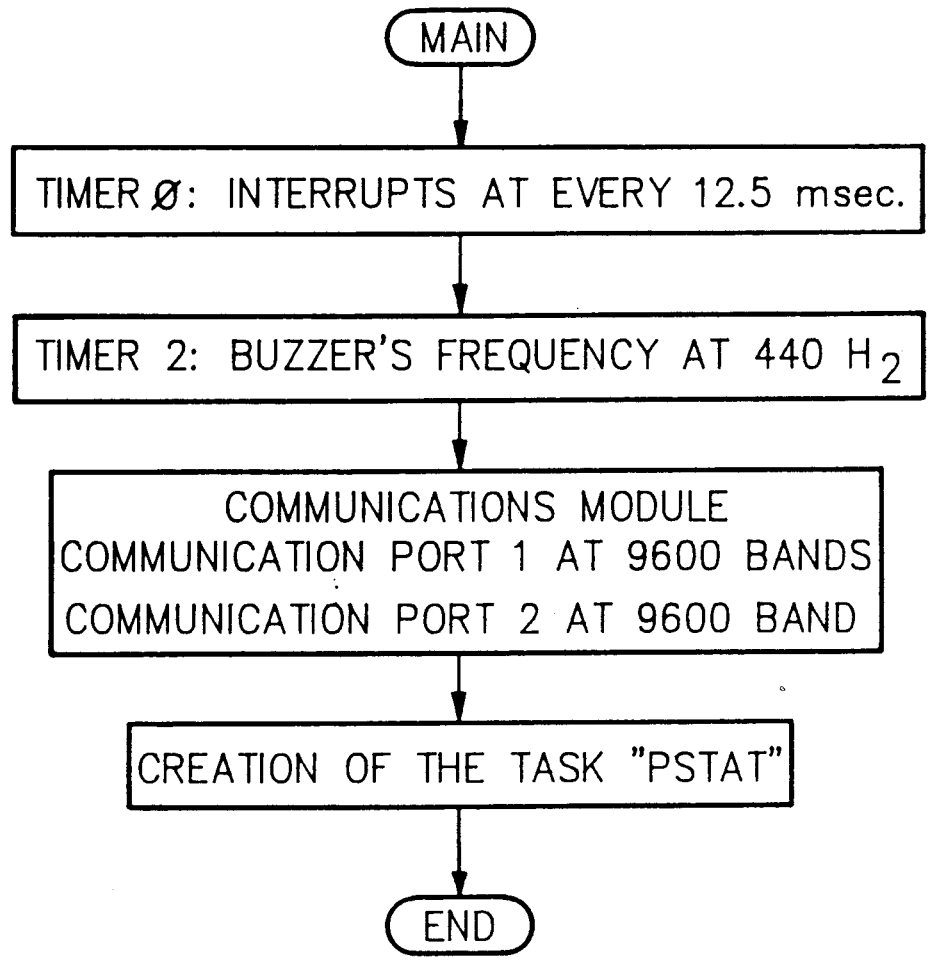
FIG. 3 is a flow chart of the MAIN software program of the system.

In FIG. 3, timer 0 controls the task switching rate for the multi-tasking operating system. Timer 2 controls the frequency of the buzzer connected to the speaker in the microcomputer. The buzzer's frequency is changed to around 440 Hz in an actual embodiment. The user hears the buzzer every time a mistake is typed on the microcomputer's keyboard or the alarm is beeping.

Figure 4:
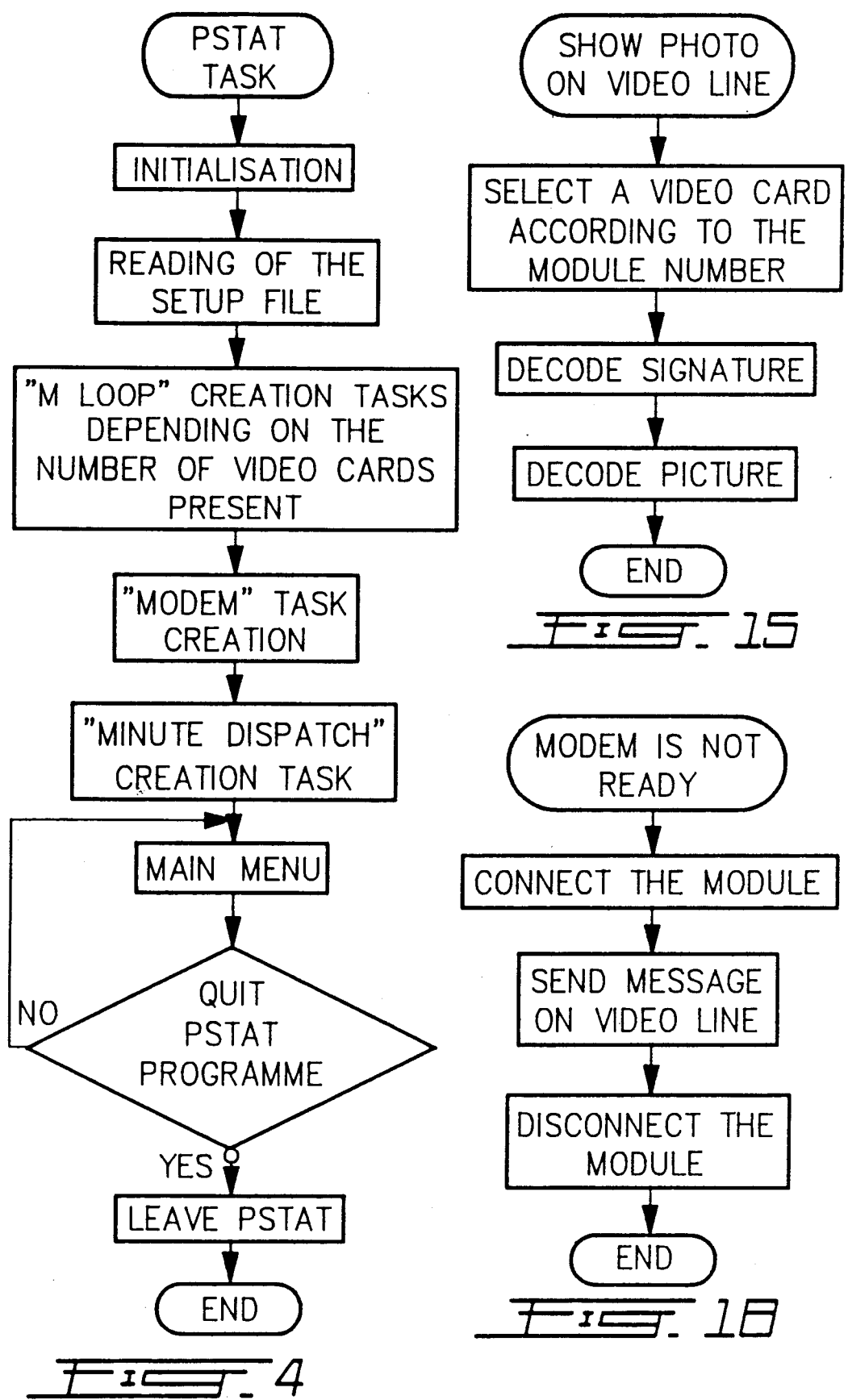
FIG. 4 is a flow chart of the PSTAT task creation software of the creation of the task "PSTAT" block of FIG. 3.
Figure 20:
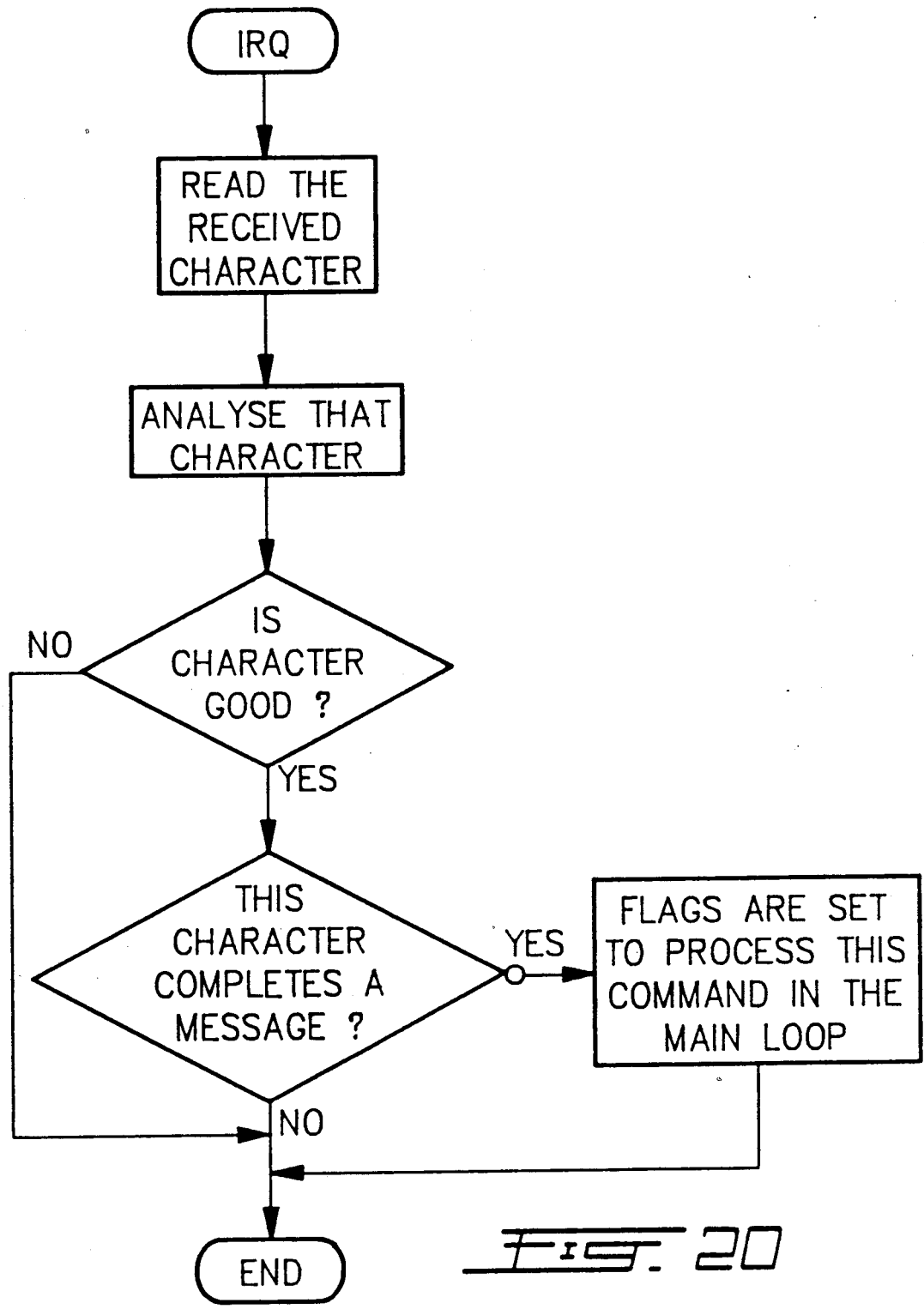
FIG. 20 is a flow chart for the communication controller means for receiving character from the communication cable.

The communication module is illustrated in the flow charts of FIGS. 19 and 20 and the creation of task PSTAT is illustrated in FIG. 4.

Figure 5:
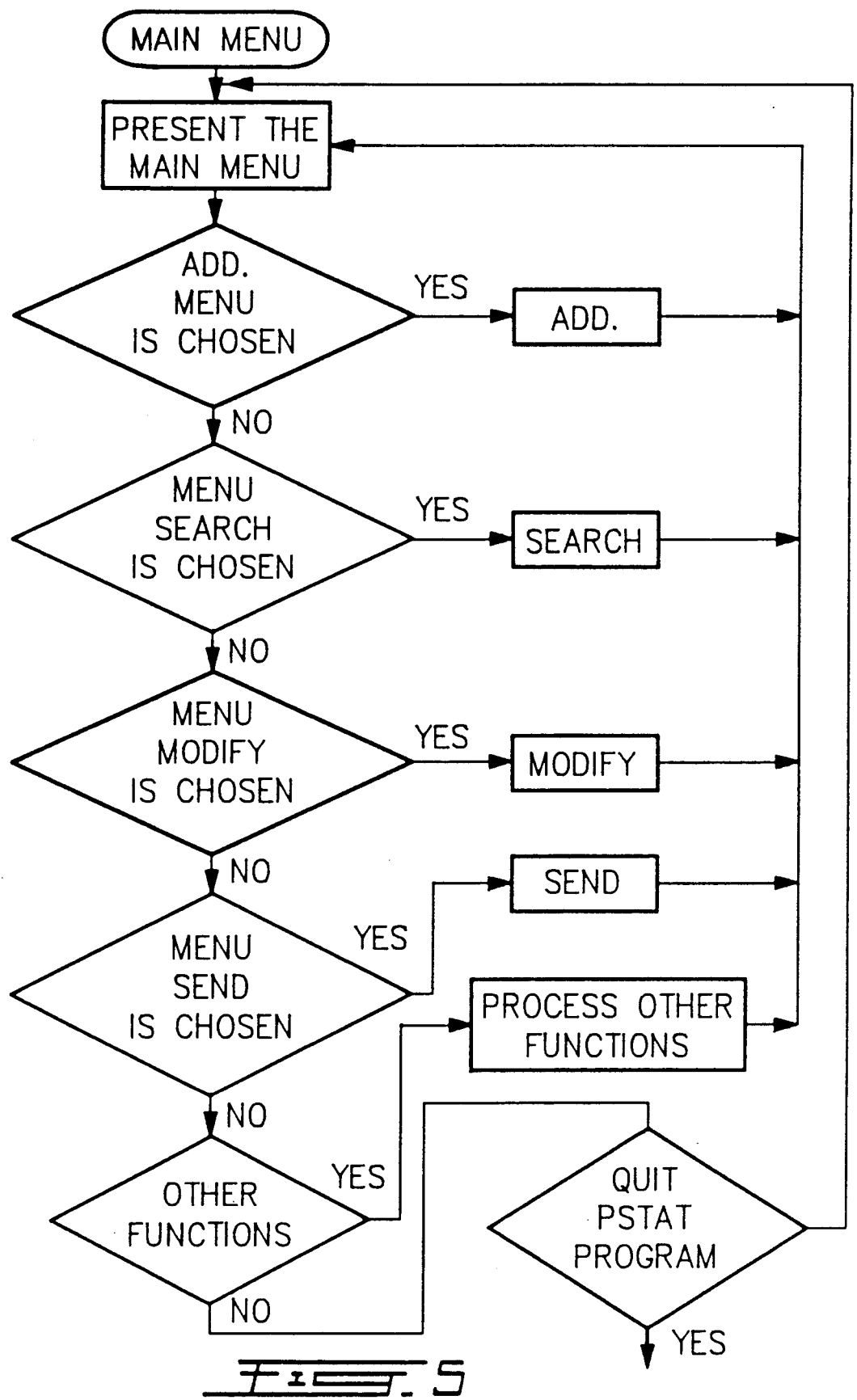
FIG. 5 is a flow chart of the MAIN menu block of FIG. 4.
Figure 6A:
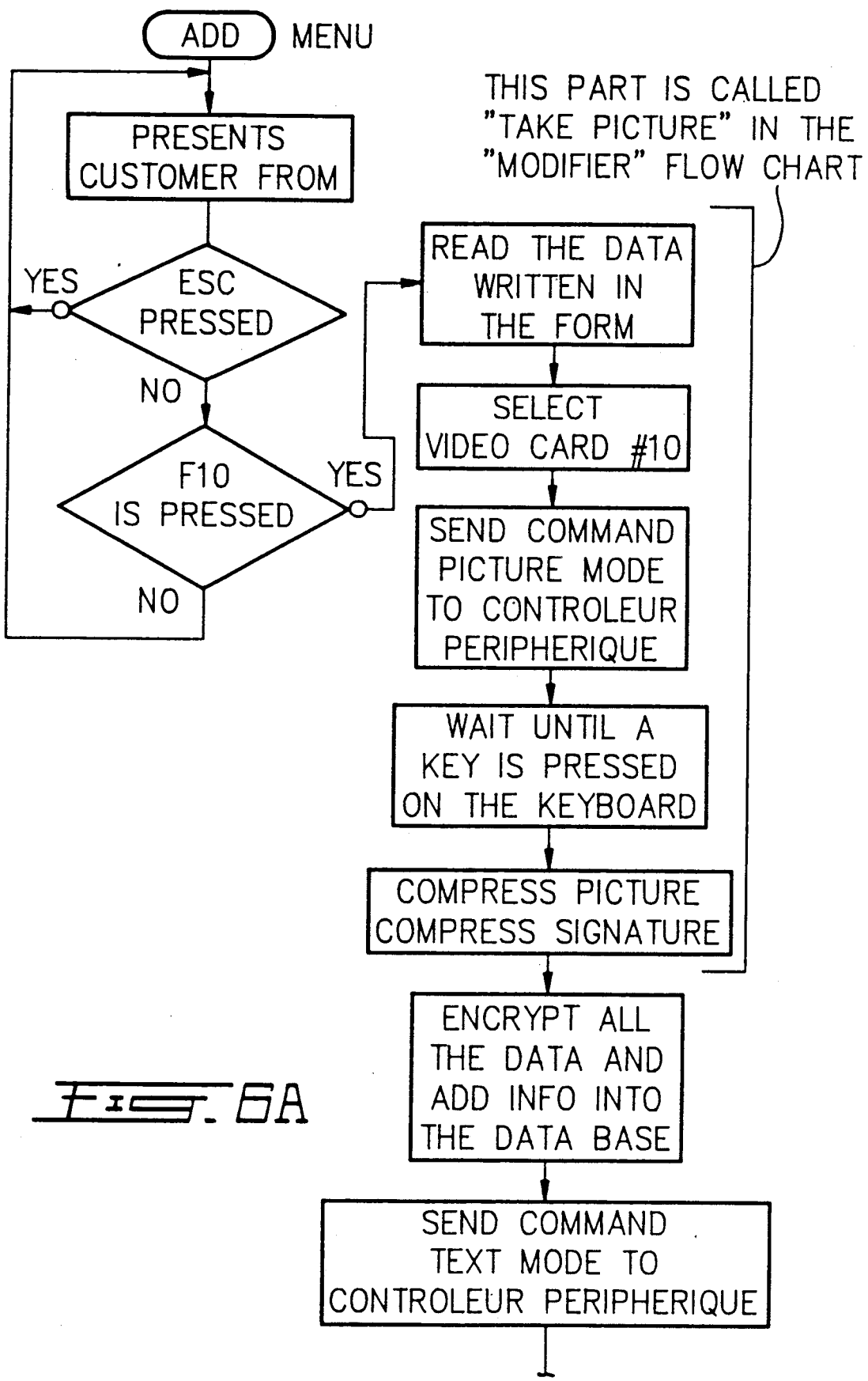
FIG. 6 is a flow chart of the ADD block of FIG. 5.
Figure 6B:
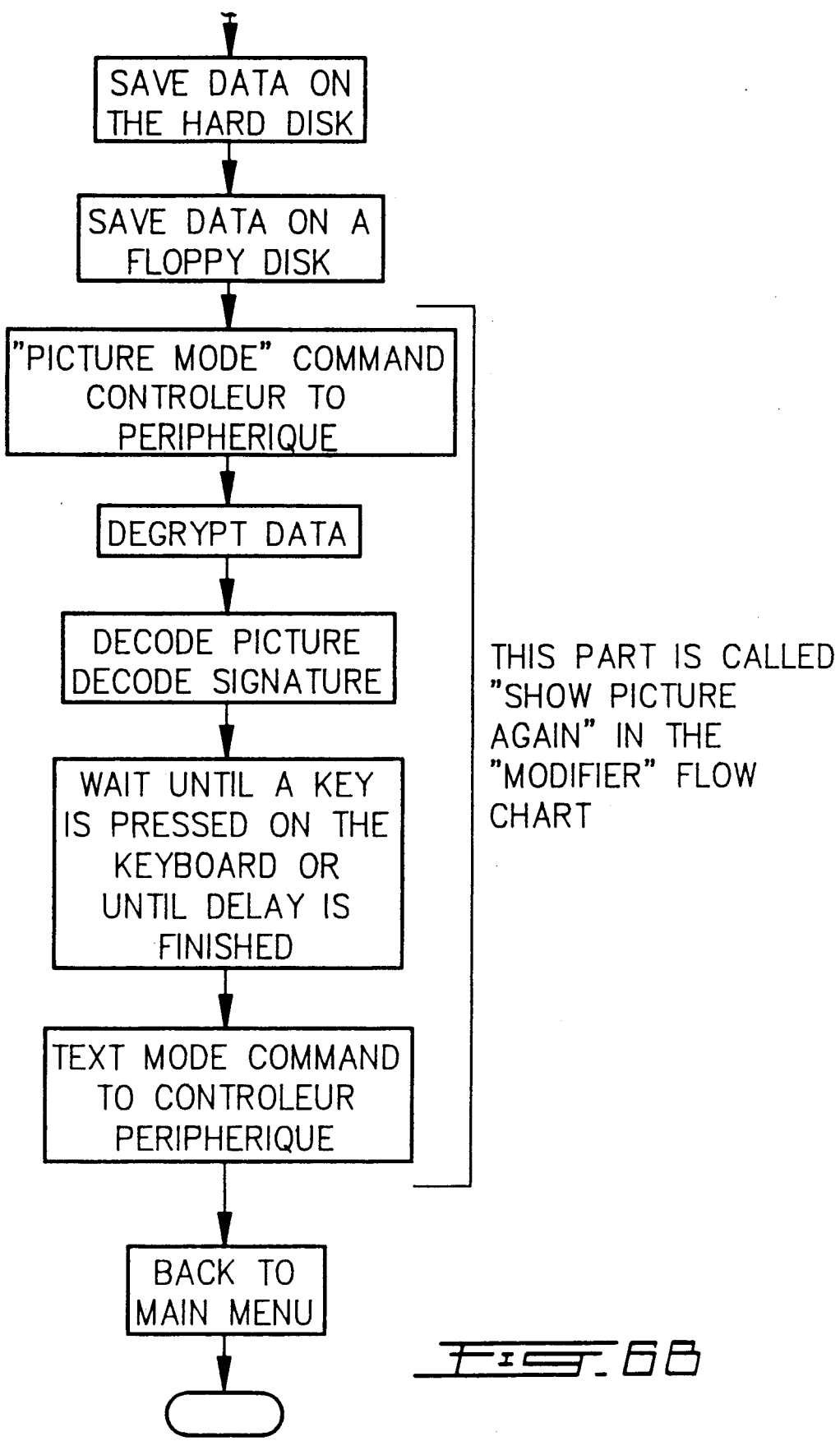

Turning to FIG. 4, the PSTAT task creates the "mLOOP" task (FIG. 14), the MODEM task (FIG. 11), the MINUTE DISPATCH CREATION task (FIG. 13) and the MAIN menu. The MAIN menu is illustrated in FIG. 5 and includes the ADD menu, for creation of the data base and for additions to the data base, the SEARCH menu, to search the data base, the MODIFY menu, to modify the data base and the SEND menu, to send requests (folio or birth date) to geographically remote locations through a MODEM. In the ADD menu (see FIG. 6), the data supplied by the camera 1 is compressed and stored in memory (see using the "take picture" blocks). At the same time, the picture on the camera is displayed on the monitor 13 (see "show picture again" blocks).

The COMPRESS PICTURE and COMPRESS SIGNATURE flow charts are illustrated in FIG. 7.

Figure 8A:
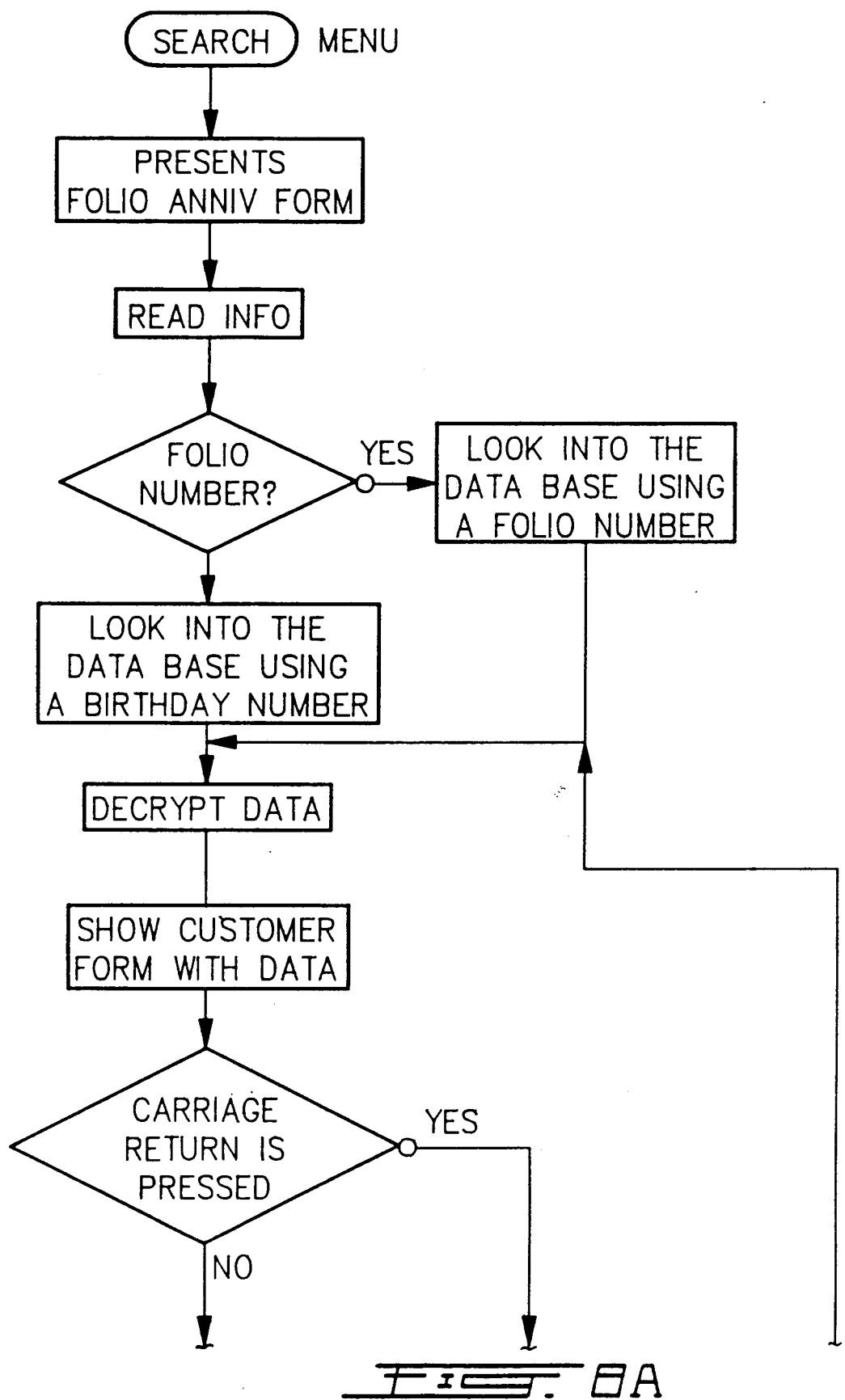
FIG. 8 is a flow chart of the SEARCH block of FIG. 5.
Figure 8B:
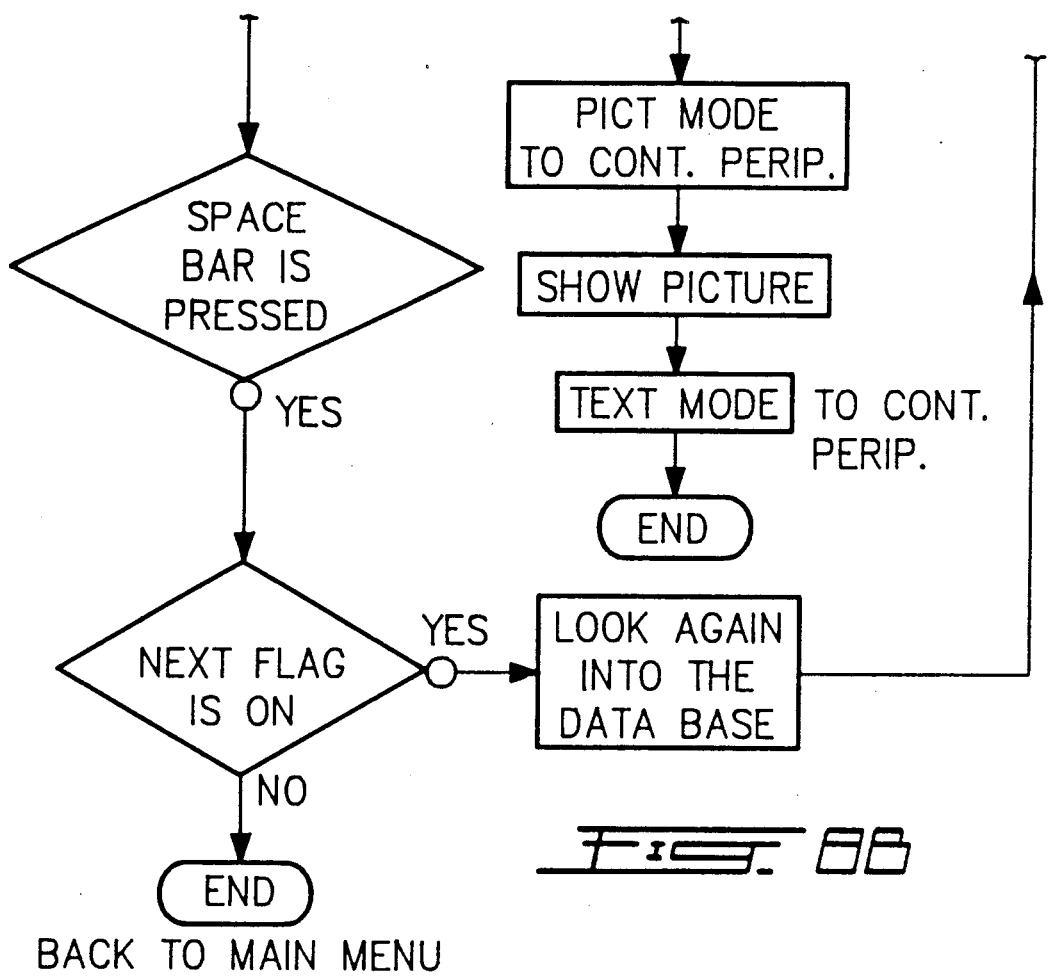

In the SEARCH menu of FIG. 8, the folio number is first checked against available folio numbers. If a folio number exists, then the location of the data base relating to that folio number is accessed. Instead of using a folio number, the data base may be accessed using a birthday number.

After the search for the folio number (or birth date) in the data base, the system shows information about the first candidate corresponding to the folio number (or birth date). The picture is not shown at this time. Instead, a message is displayed which states that the RETURN key should be pressed if the viewer wishes to see this picture. If the RETURN key is pressed, the picture will be decompressed and displayed on the monitor of the microcomputer. If the viewer does not wish to see the picture about which information is being displayed, he will press the SPACE bar to see information concerning the next candidate (if there is more than one candidate for the folio or birth date). If there are candidates, then the computer searches for the next flag. If there is no flag, the program returns to the MAIN menu. If there is a flag, then it once again looks into the data base.

Figure 11:
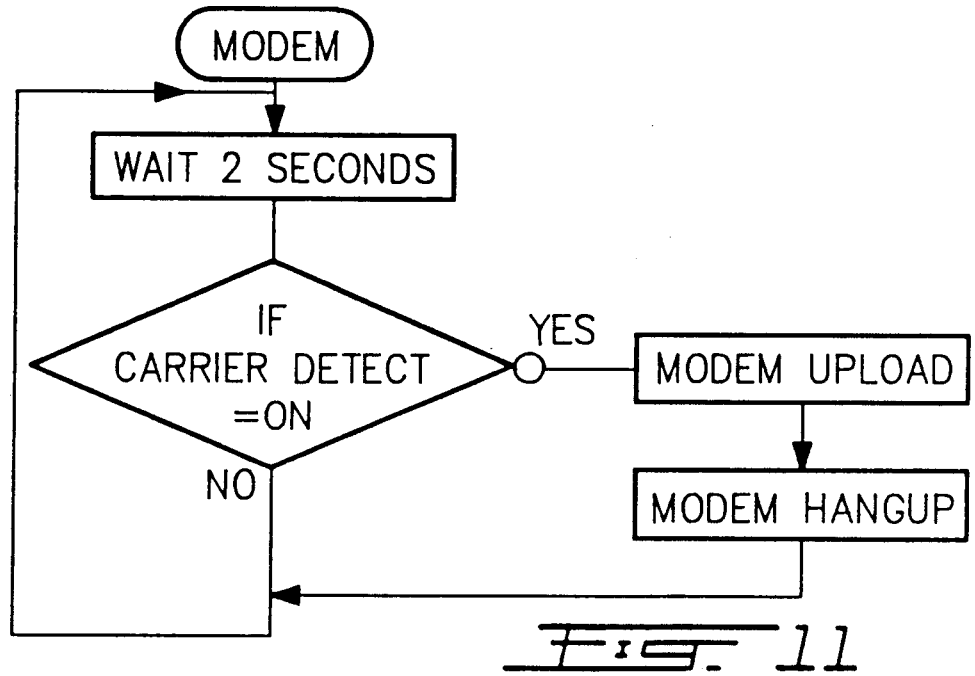
FIG. 11 is a flow chart of the MODEM TASK CREATION block of FIG. 4.
Figure 10A:
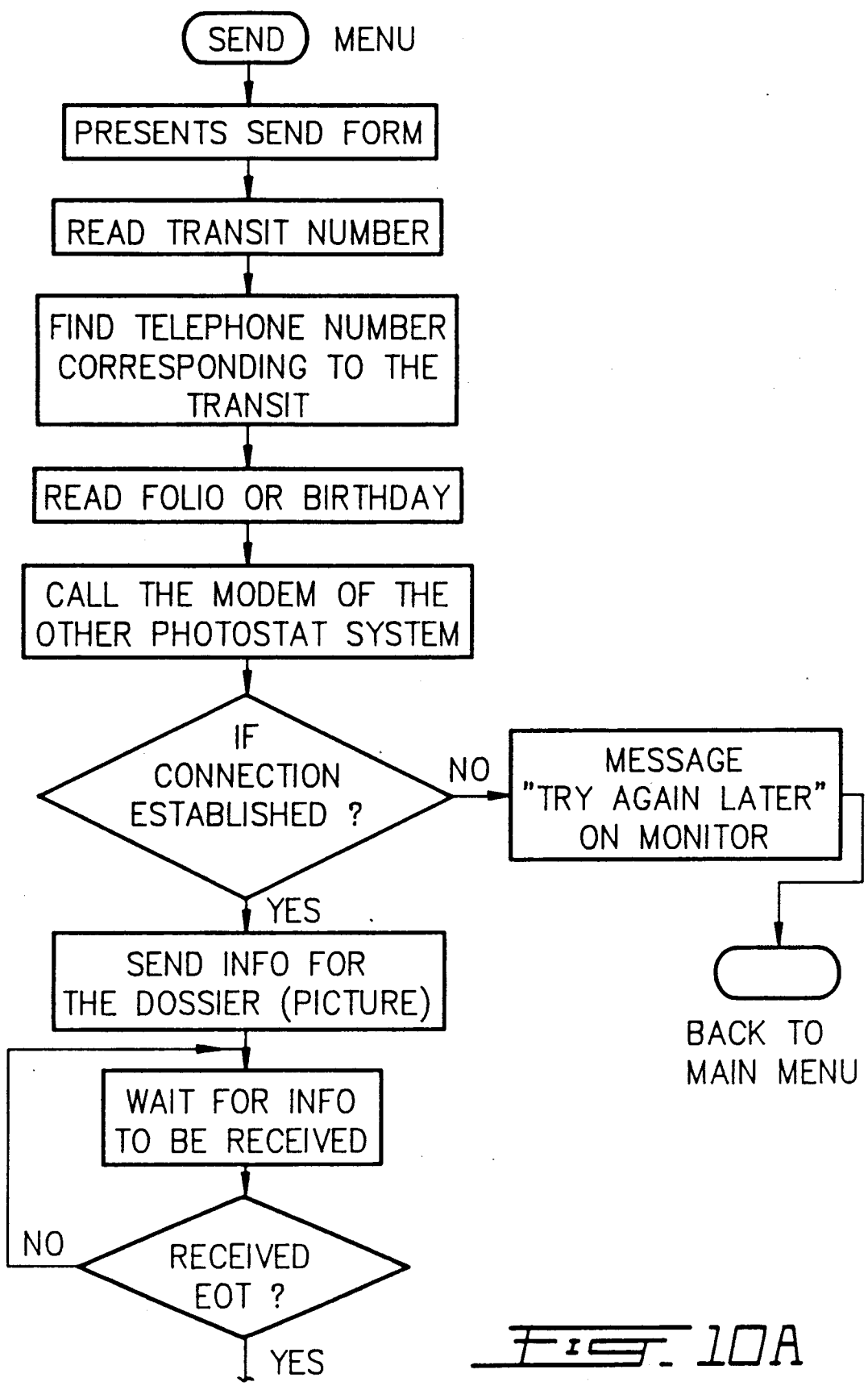
FIG. 10 is a flow chart of the SEND block of FIG. 5.
Figure 10B:
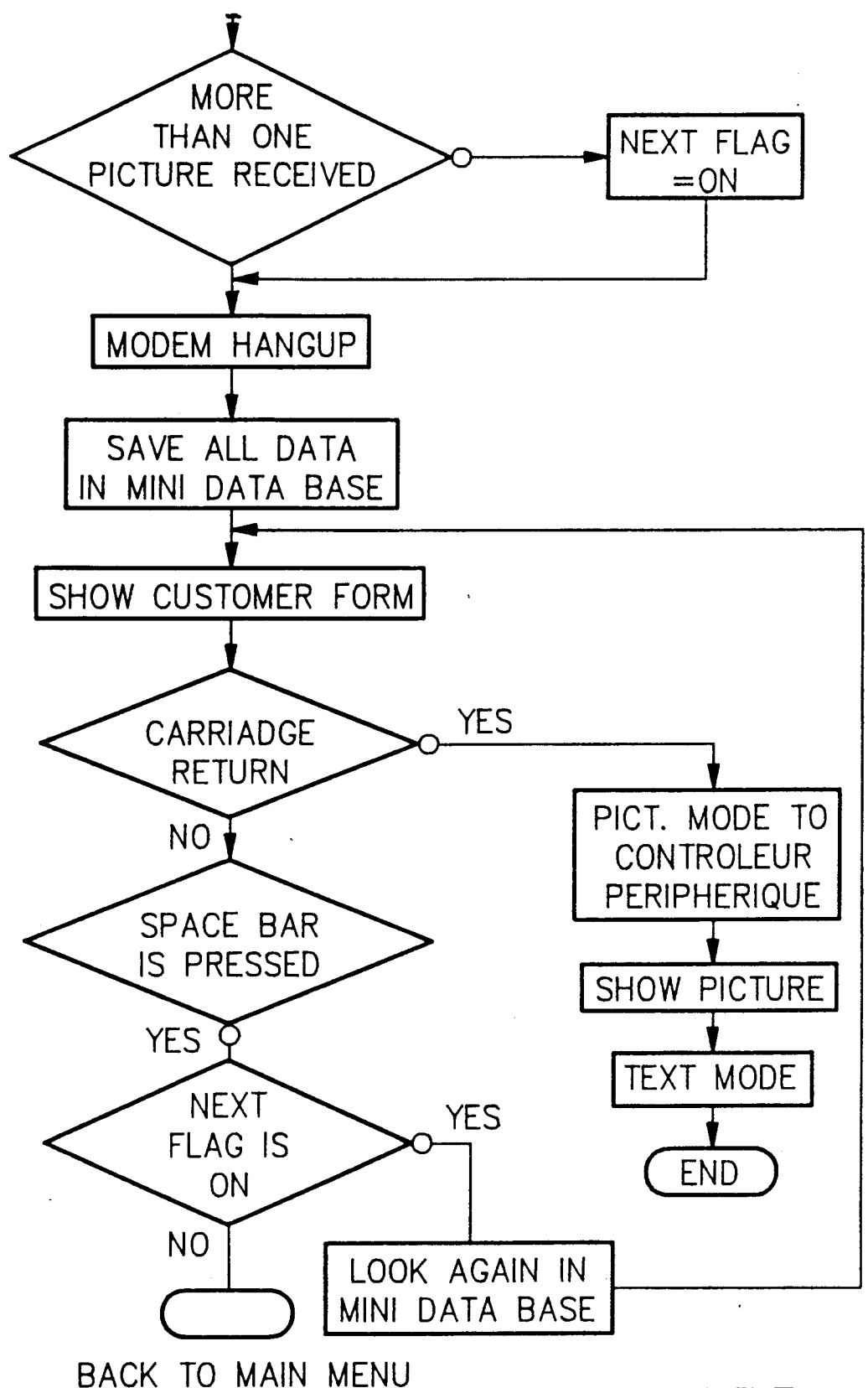
Figure 12:
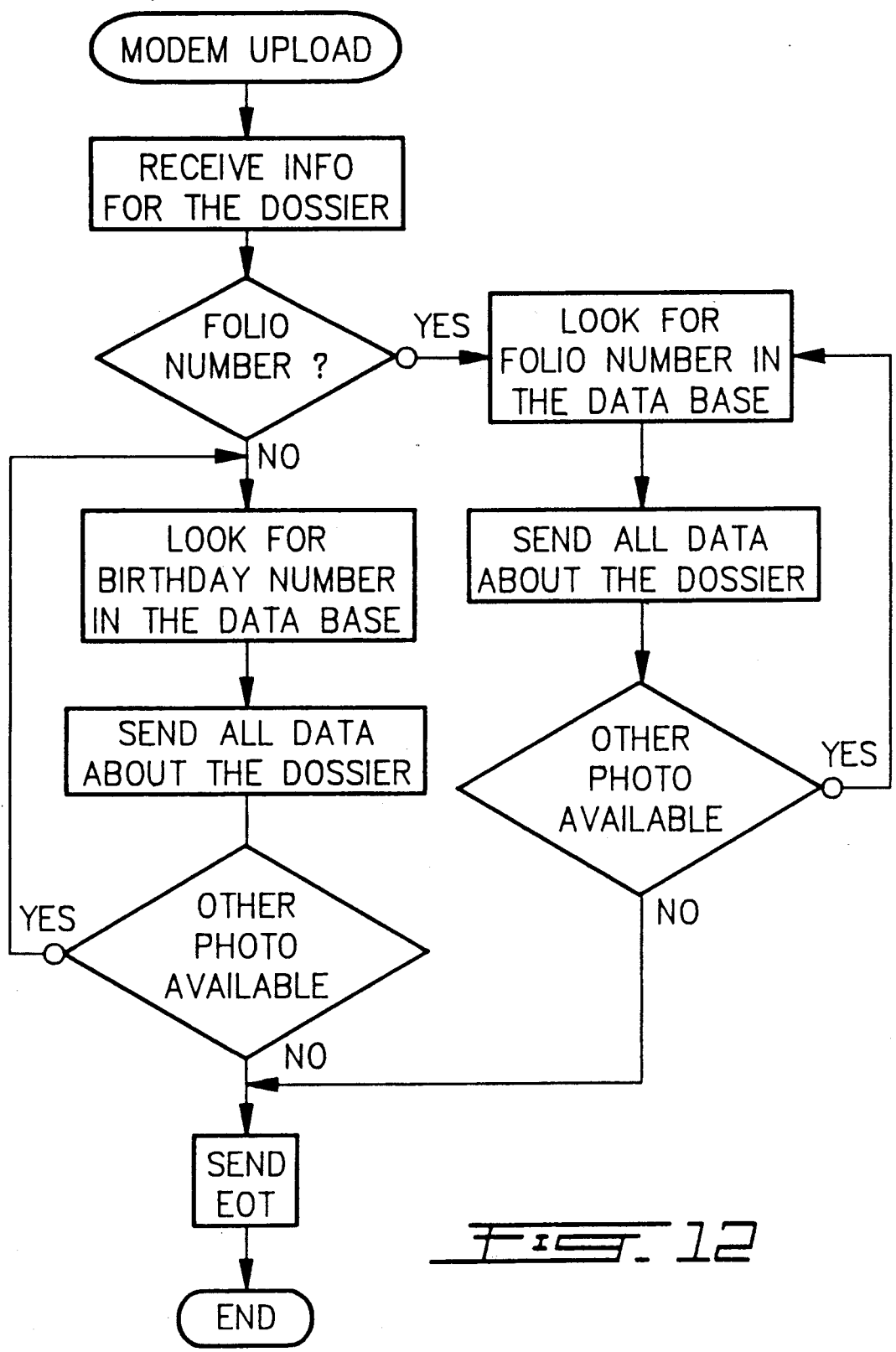
FIG. 12 is a flow chart of the MODEM-UPLOAD block of FIG. 11.

The MODIFY menu is illustrated in FIG. 9. As can be seen, the MODIFY menu permits modification of data already in the data base by modifying either the text or by providing a different picture. The SEND menu, as illustrated in FIG. 10, permits sending REQUEST over a telephone wire using a MODEM. The MODEM task menu is illustrated in FIG. 11, and the MODEM upload of the MODEM task menu is illustrated in FIG. 12.

Figure 13:
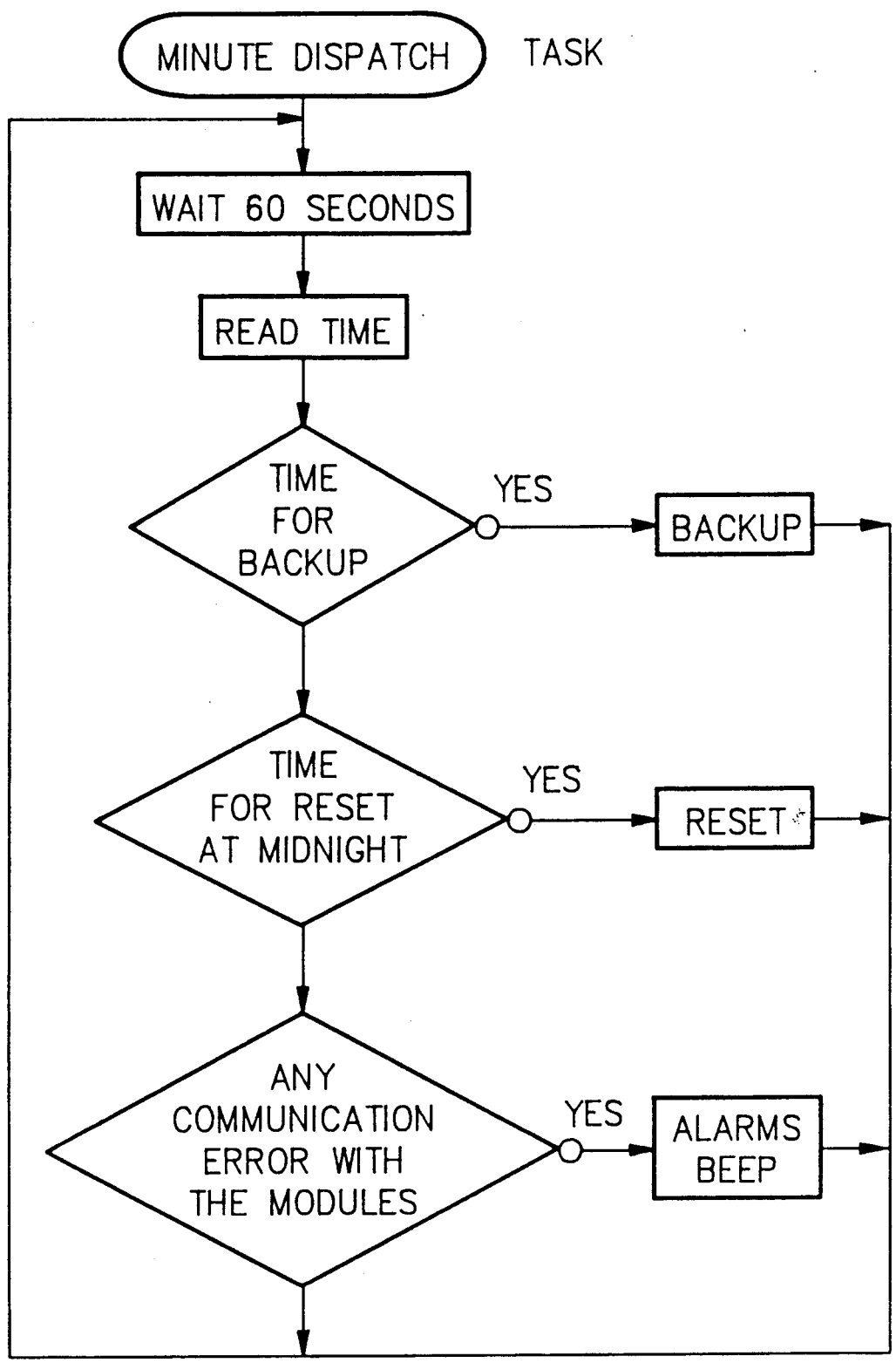
FIG. 13 is a flow chart of the MINUTE DISPATCH CREATION TASK block of FIG. 4.
Figure 14A:
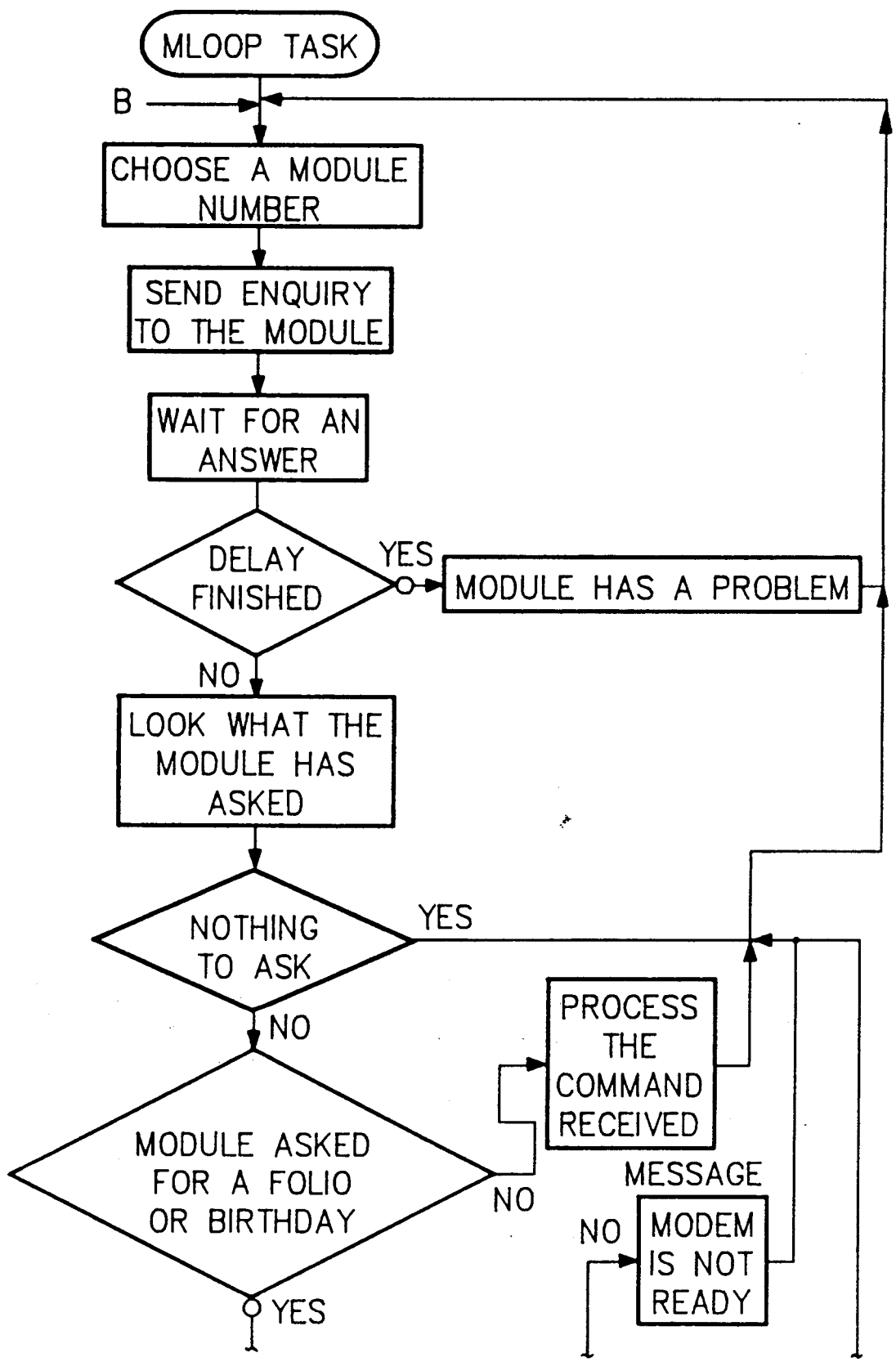
FIG. 14 is a block diagram of the mLOOP CREATION TASK of FIG. 4.
Figure 14C:
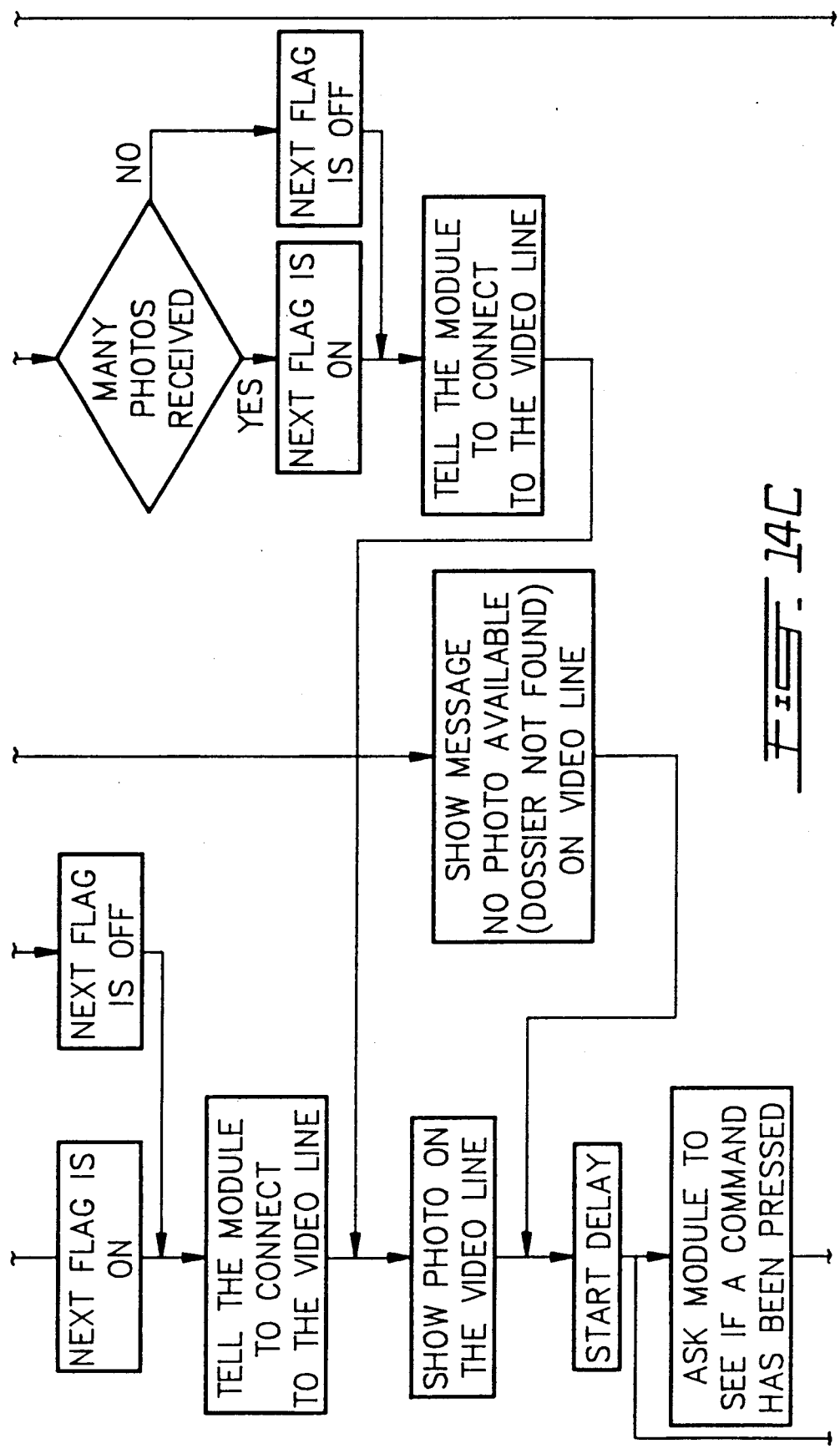

The MINUTE DISPATCH task of FIG. 13 determines whether it is time for a back-up, a re-set or an alarm. The mLOOP task is the task by which the microcomputer 11 queries the communication controller means 5. It also illustrates how a request from a communication controller means is dealt with. The show photo software of the SHOW PHOTO block in FIG. 14 is illustrated in FIG. 15, and the decode signature and decode picture blocks of FIG. 15 are illustrated in, respectively, FIGS. 16 and 17. The MODEM IS NOT READY block of FIG. 14 is illustrated in FIG. 18.

The communication controller means 5 software is shown in FIG. 19. As can be seen, the keyboards of the monitors associated with the communication controller means 5 are monitored and read. In addition, communications from the microcomputer 11 are also monitored and acted on.

The flow chart in FIG. 20 explains how the communication control means receive and analyze the characters received from the communication line. All characters are received by interruption, so the main software routine does not have to check the communication chip to see if a character has been received.

Figure 21:
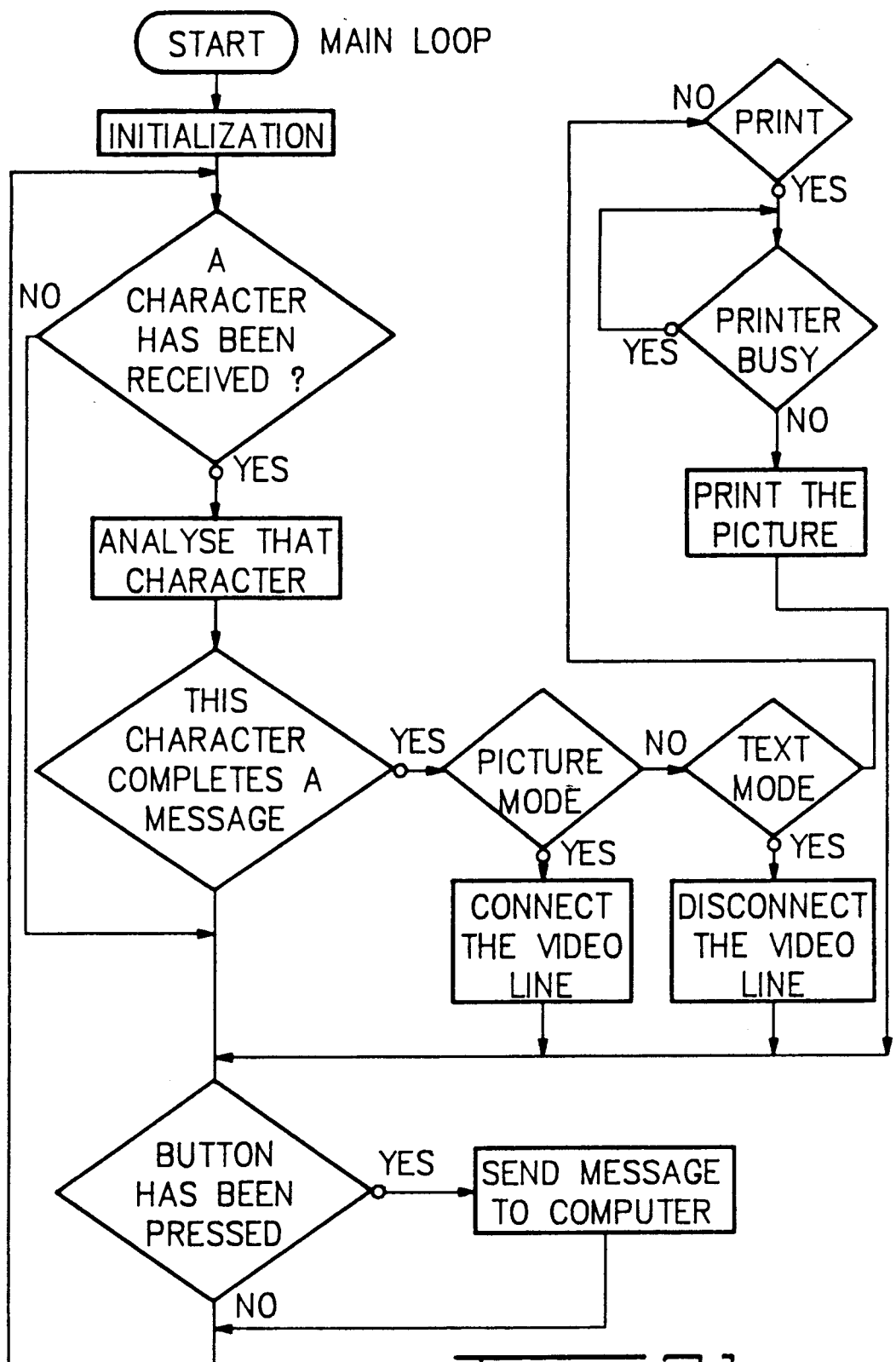
FIG. 21 is the flow chart for the software of the Peripheral controller means.

The flow chart of the software controlling the operation of the peripheral controller means is illustrated in FIG. 21. As can be seen, the peripheral controller determines which one of its video inputs (text card or video card 0), must be switched to the monitor 13. It also determines whether a picture on monitor 13 should be printed.

Although only a single embodiment has been described, this was for the purpose of illustrating, but not limiting, the invention. Various modifications, which will come readily to the mind of one skilled in the art, are within the scope of the invention as defined in the appended claims.

We claim,

1. A computerized filing and retrieval system for signatures and pictorial documentation which comprises:
    camera means;
    a microcomputer having a memory means and being in communication with said camera means;
    means for converting pictorial and signature information to coded data which is stored in said memory means at predetermined locations thereof;
    peripheral controller means in communication with said microcomputer;
    a plurality of communication controller means in communication with said microcomputer;
    a plurality of monitors for displaying said signature and pictorial documentation;
    each said monitor being in communication with only one communication controller means, each said communication controller means being in communication with up to two monitors;
    wherein, on receipt of a query signal by an nth communication controller means from an mth monitor, in communication with said nth communication controller means, said query signal being associated with a pth signature or pictorial document, said nth communication controller means queries said microcomputer;
    said microcomputer determining the location of the coded data associated with said pth signature or pictorial document in said memory means and decoding said coded data associated with said pth signature or pictorial document;
    whereby, to provide, to said mth controller, the data for creating said pth signature or pictorial document through said nth communication controller means.

2. A system as defined in claim 1 wherein said means for converting comprises compression circuitry.

3. A system as defined in claim 2 wherein said microcomputer decodes said coded data using the compression circuitry.

4. A system as defined in claim 3 wherein a microcomputer monitor is associated with said microcomputer; and
    wherein said peripheral controller means comprises two video inputs and a video output, said peripheral controller means comprising means for switching from said two video inputs to said video output, said video output being connected to said microcomputer monitor;
    said peripheral controller means further including means for receiving requests from said microcomputer.

5. A system as defined in claim 4 wherein each said communication controller means comprises;
    means for receiving requests from an associated requesting monitor and for forwarding same to said peripheral controller means; and
    means for connecting a requesting monitor to said microcomputer to receive data for creating said pth signature or pictorial document on the screen of said requesting monitor.

6. A system as defined in claim 5 wherein said camera means comprises means for providing pictorial documentation data at an output thereof;
    and further including a microcomputer monitor;
    means connecting said output of said camera to said compression circuitry whereby to provide compressed pictorial documentation data;
    means for connecting said output of said camera to said microcomputer monitor whereby to view the contents of said camera on said microcomputer monitor; and
    means for storing said compressed pictorial documentation data in said memory means.

7. A system as defined in claim 6 wherein said microcomputer is AT compatible; and
    wherein said memory means comprises a hard disc.

8. A method for filing and retrieving signatures and pictorial documentation with a system comprising:
    camera means;
    a microcomputer having a memory means and being in communication with said camera means;
    peripheral controller means in communication with said microcomputer;
    a plurality of communication controller means in communication with said peripheral controller means;
    a plurality of monitors for displaying said signature and pictorial documentation;
    each said monitor being in communication with only one communication controller means, each said communication controller means being in communication with up to two monitors;
    said method comprising;
    converting signature and pictorial information to coded data which is stored in said memory means at predetermined locations thereof;
    an nth communication controller means receiving a query signal from an mth monitor, in communication with said nth communication controller means, said query signal being associated with a pth signature or pictorial document;

said mth controller means querying said microcomputer;

said microcomputer determining the location of the coded data associated with said pth signature or pictorial document in said memory means and decoding said coded data associated with said pth signature or pictorial document;

whereby, to provide, to said mth controller, the data for creating said pth signature or pictorial document through said nth communication controller means.

* * * * *